United States Patent
Lerenc et al.

(10) Patent No.: US 6,662,182 B1
(45) Date of Patent: *Dec. 9, 2003

(54) MANAGEMENT SYSTEM FOR THE SELECTIVE PROVISION OF INTERNET INFORMATION FOR CLOSED USER GROUPS

(75) Inventors: Vedran Lerenc, Waghausel (DE); Jochen Sandvoss, Mannheim (DE)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/240,268

(22) Filed: Jan. 29, 1999

(30) Foreign Application Priority Data

Mar. 30, 1998 (DE) .......................................... 198 13 883

(51) Int. Cl.[7] ................................................. G06F 7/00
(52) U.S. Cl. ......................... 707/10; 707/205; 709/229; 709/230; 709/236
(58) Field of Search ............................... 709/236, 229, 709/230; 707/9, 10, 205

(56) References Cited

U.S. PATENT DOCUMENTS 5,822,539 A * 10/1998 van Hoff .................... 709/236
6,223,177 B1 * 4/2001 Tatham et al. ................. 707/9

OTHER PUBLICATIONS

Microsoft Corporation, Microsoft Press Computer Dictionary, copyright 1997 by Microsoft Corporation, pp. 197 and 387.*

* cited by examiner

*Primary Examiner*—Kim Vu
*Assistant Examiner*—Hung Pham
(74) *Attorney, Agent, or Firm*—Duke W. Yee; A. Bruce Clay; Stephen R. Tkacs

(57) ABSTRACT

The present invention describes a method and a system for the specific supply of internet information to closed user groups. Direct access to data in the internet from internal-company networks does not always make sense for reasons of security and productivity. To enable employees to access current internet information without these disadvantages, a management system is proposed in the present invention which replicates onto a local web server only data of the internet which are relevant to company employees selectively, automatically and taking the specific characteristics of web documents into account. The documents can be rearranged in a manner independent of the internet and are thereby easier to find and more rapidly accessible to the user. The information is updated repeatedly at certain intervals. The users thus always have access to the latest information.

20 Claims, 6 Drawing Sheets

MANAGEMENT SYSTEM FOR THE SELECTIVE PROVISION OF INTERNET INFORMATION FOR CLOSED USER GROUPS

FIELD OF THE INVENTION

The present invention relates in general to computer software, and in particular to a simplified method and system for accessing internet information for closed-user groups.

BACKGROUND OF THE INVENTION

Many companies now enable their employees to access the internet via the company's own network. This trend will increase in the future. It has been recognized that access to current information from the internet can improve the competitiveness of the company.

At the same time, problems are becoming increasingly apparent in connection with the internet:

It is often difficult to find the information required on the internet.

Once the information has been found, it frequently has to be downloaded via very slow network connections.

Employees with similar tasks frequently require the same information. Even now, each person normally searches for information independently and also downloads it independently from the internet for him/herself. Possible synergies are not being utilized.

Owing to the problems stated, many employees do without using the internet and thus fail to acquire the information which is actually useful.

The internet offers a wide variety of very different information. Due precisely to the linkage of individual documents by hyperlinks, one often accesses pages which no longer have anything to do with the information originally sought. The user is diverted from the actual task and works in a less purposeful manner. Time is easily squandered unnecessarily in this way.

If the network connection fails, an employee who requires unconditional access to information on the internet cannot continue working.

The only approach known hitherto is the use of a proxy. The proxy can be configured such that the last pages retrieved from the internet are always held in the cache. Documents which are required frequently can thus be downloaded faster. The proxy can also be configured such that employees cannot access pre-specified web servers with data which are not required for the work.

SUMMARY OF THE INVENTION

Even this solution only covers partial aspects. The search for information is problematic here; here as before employees have to filter the relevant data out of the extensive range of information offered on the internet. It is only possible to block access to certain information by blocking entire web servers.

Vol. 40, No. 06, mechanisms for monitoring documents and adapting links.

BRIEF DESCRIPTION OF THE DRAWINGS

The object of the present invention is therefore to provide a system and method which; permits the information available in the internet to be prepared according to defined user profiles, in order to be able to find and load this information quickly and to be able to exclude access authorization to other information.

This object is achieved by the features of claim 1 and 20. Other advantageous practical examples are set down in the sub-claims.

The present invention is explained in greater detail with reference to a preferred practical example, with regard to which

The advantage of the present invention consists in the fact that the advantages of the internet can be used without however having to accept the disadvantages of the internet, to be precise long loading times for the documents requested. The solution of the present invention is based on a separation of the users from the internet. FIG. 1 shows the structure in principle of the present invention compared with the prior art. In the prior art, the intranet, consisting of several clients networked together and at least one server, and the internet are separated from one another only by a firewall. Each user goes into the internet via a server of the intranet. In the present invention, users access a local web server, which replicates the relevant parts of the internet as a logical "mini-web". The local web server is part of the intranet. Users no longer leave the intranet. Consequently, the loading times for individual documents are judged according to the performance behaviour of the intranet. Access to the internet can be blocked for users.

Figure 1A:
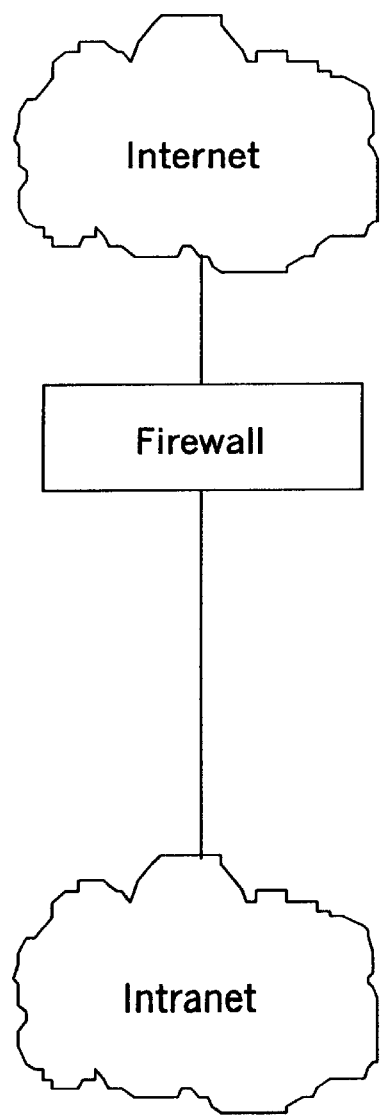
FIG. 1 shows the structure in principle of the inventive management system compared with the prior art.
Figure 1B:
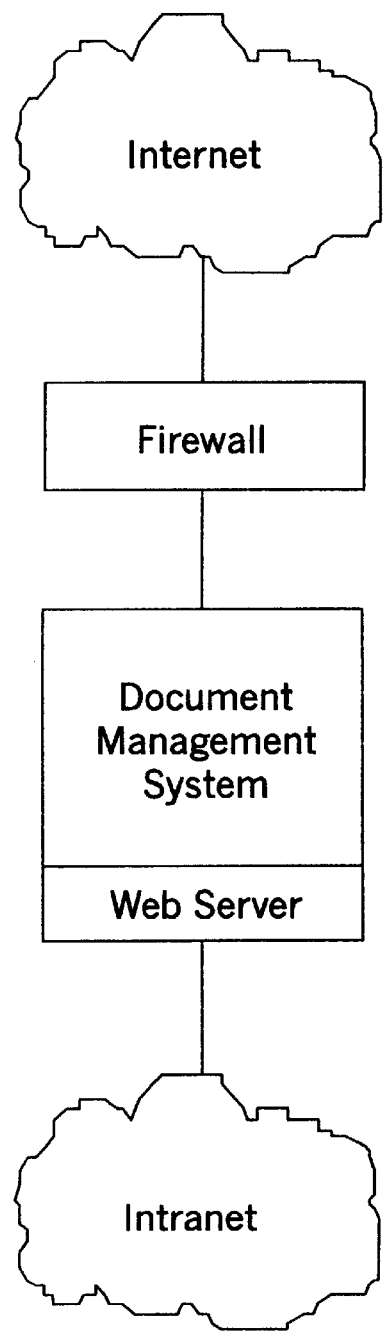

A central element in the present invention is the management system, which manages the link between local data and the data in the internet. The diagrammatic structure of the inventive management system is represented in FIG. 1.

The management system lies between the internet access and a local web server. As illustrated in FIG. 1, internet access is still normally protected by a firewall against unauthorised accesses from the internet. The local web server is required to represent the local "mini-web" inside the company-wide intranet.

Figure 2:
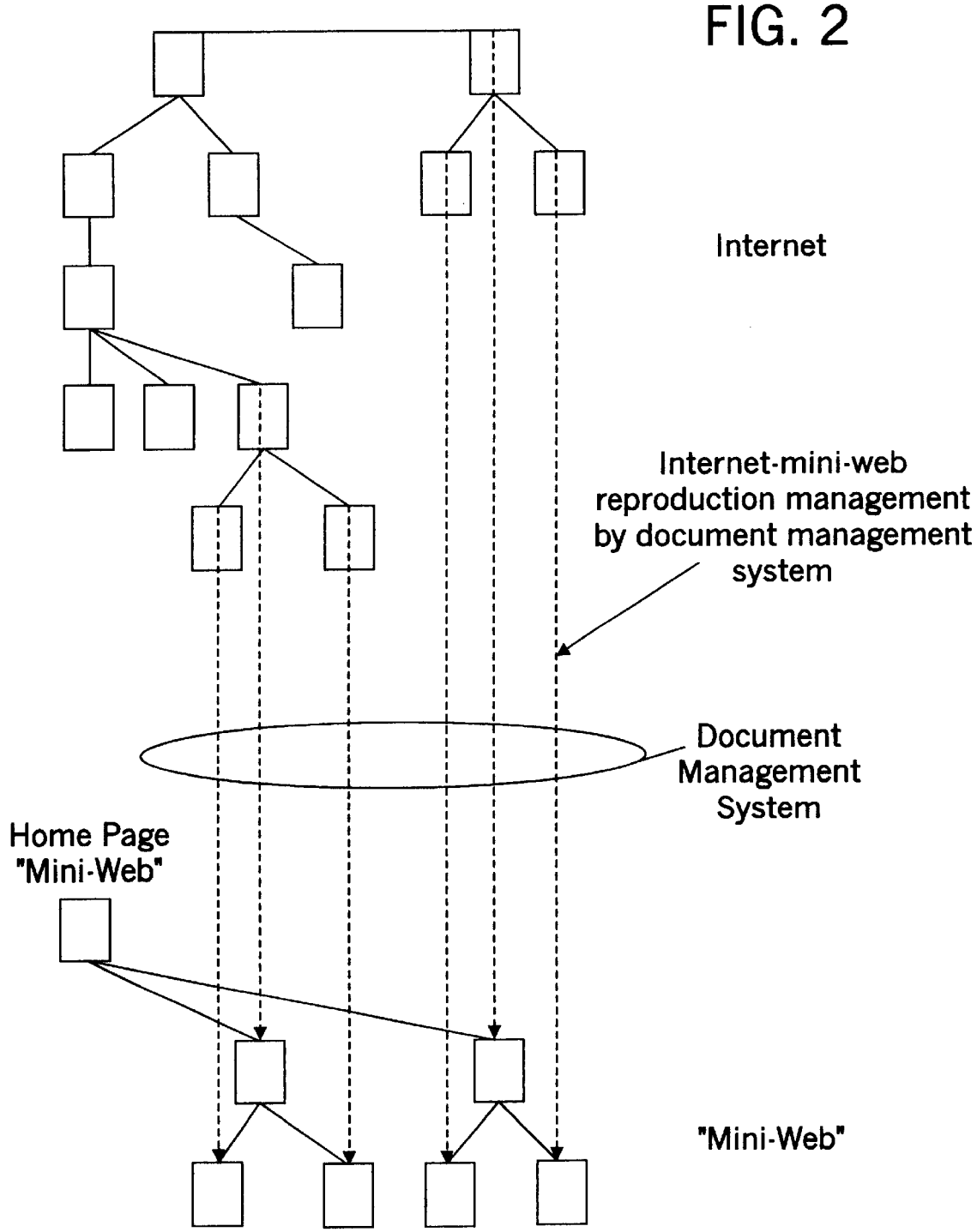
FIG. 2 shows the inventive management system.

The logical connection between the contents of the internet and the "mini-web" is illustrated in FIG. 2. The central element here is the management of reproduction information between relevant parts of the internet and the data replicated in the "mini-web".

As shown in FIG. 2, the arrangement of the relevant sub-branches of the internet may differ from that in the "mini-web". In this way data can be structured in a form better suited to the users and can thus be found more easily and quickly.

Service Description of the Inventive Management System

With this solution formulation, the management system must support a range of different functions:

Collection of user requests

Support for the administrator with regard to translation into specific search requests Search and acquisition process running automatically in the background Support with regard to analysis of the information found Support with regard to selection of data which are of value to the company Support with regard to construction of a logical mini-web Operation of mini-web Collection of user requests The central internal-company information system is normally the web. Web pages are offered accordingly in which users can specify their requests. The requests can be specific web addresses or search terms. The information is forwarded to the management system, where it is processed further either automatically or under the control of the administrator.

With regard to search requests, two different alternatives are available:

1. On the one hand, natural-language requests can be transmitted via electronic message exchange or a question page transmitted to the administration on the web server.
2. Search requests can be addressed directly to the data acquisition module described below. In this case, the archives generated are made directly available to the administration.
3. Support for the administrator with regard to translation into specific search requests.

Search requests can be defined from the natural-language requests. The management system contains a convenient GUI with which search requests can be specified for the data acquisition module.

Search and Acquisition Process

For the actual search, a Web Traffic Agent (WTA) can be used, for example. The advantage of this system is the search process running automatically in the background. The system processes search requests on the internet and displays the pages found in a special local "mini-web" in a format which can be read using the web browser. This mini-web is lodged in the file system designated the "intermediate store" in the architectural image.

Support with Regard to Analysis of the Information Found

The administrator is supported in the evaluation of company-relevant data by the web contents locally available in the intermediate store. The advantage here is swift access to the data present locally.

Support in the Selection of Data Which are of Value to the Company

The data are copied by the data acquisition module from the internet to the intermediate store. They remain there as logical partial trees of the internet. During selection the administrator can remove individual partial trees which are not considered relevant. The data stock is reduced to the information which is essential for the company.

Support in the Construction of a Logical Mini-web

Figure 3:
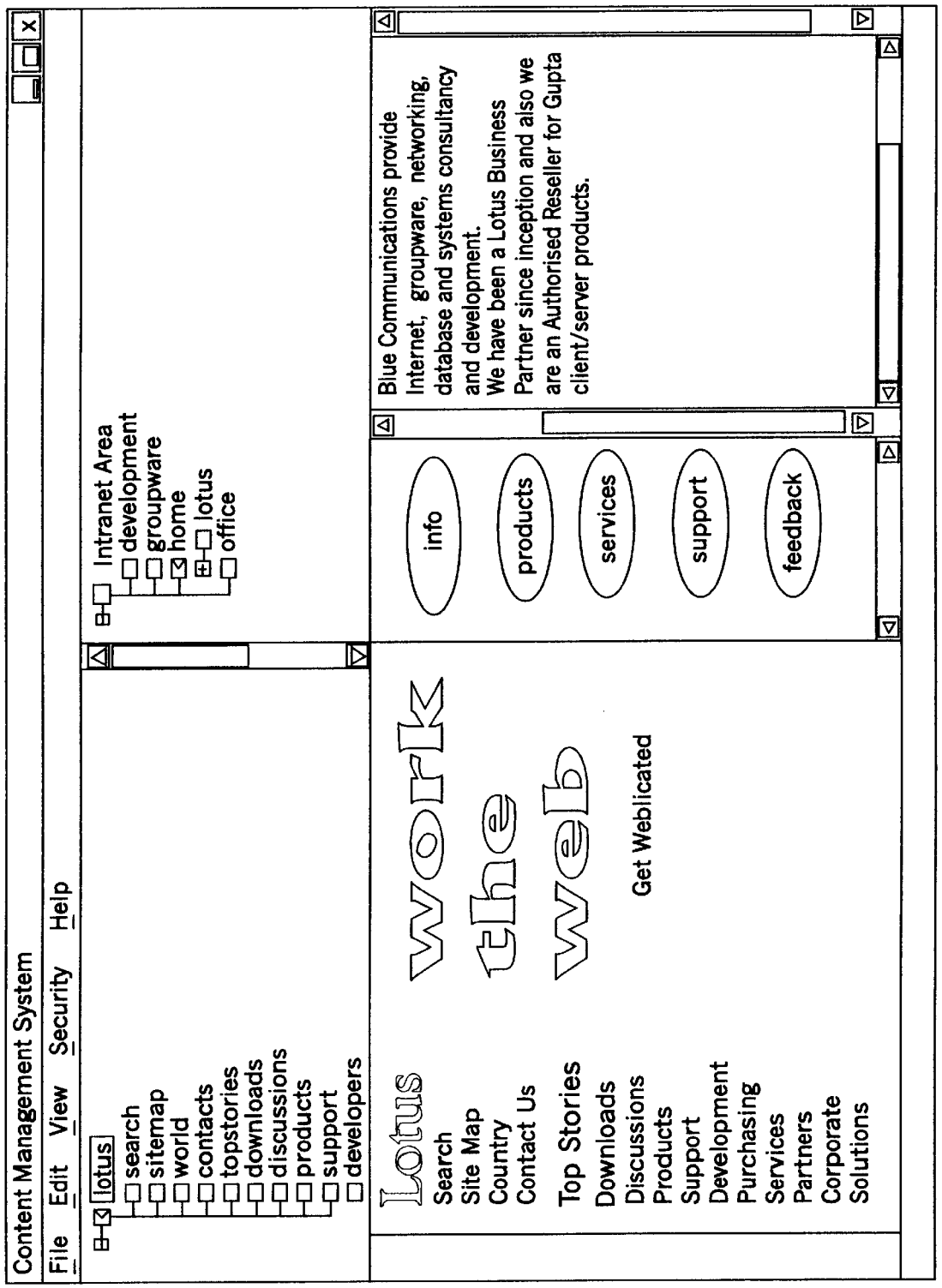
FIG. 3 shows an example for realizing a graphical user interface for the inventive management system.

The partial trees thus edited can then be combined in a local "mini-web" accessible to the employees. The administrator is supported in the construction of the logical "mini-web" by graphical tools, which represent the selected partial trees of the intermediate store as the current state of the "mini-web" as hierarchical trees. FIG. 3 shows an example of a tool of this kind. In this example, the management system takes the contents of the Lotus Notes web server into the document stock of the intranet.

The window of this example interface is organized into four areas. The left portion displays the documents which are available locally in the intermediate store but have not yet been transferred to the local web server. Via a so-called treeview the user can access directly the documents displayed as a linked tree structure (top area) or view the documents and change them (bottom area). The right side displays the contents of the local web server for the intranet. The administrator can exchange documents or document trees between these areas using drag-and-drop and link them accordingly via the editor function of the management system (see Lotus linkage). Information which is of no interest can thus be removed easily and the web server conveniently maintained.

Operation of the Mini-web

The management system manages the original addresses of the pages displayed in the local "mini-web" in a manner which enables it to detect changes in the original pages by means of regular interrogations and to update the pages displayed locally.

Figure 4:
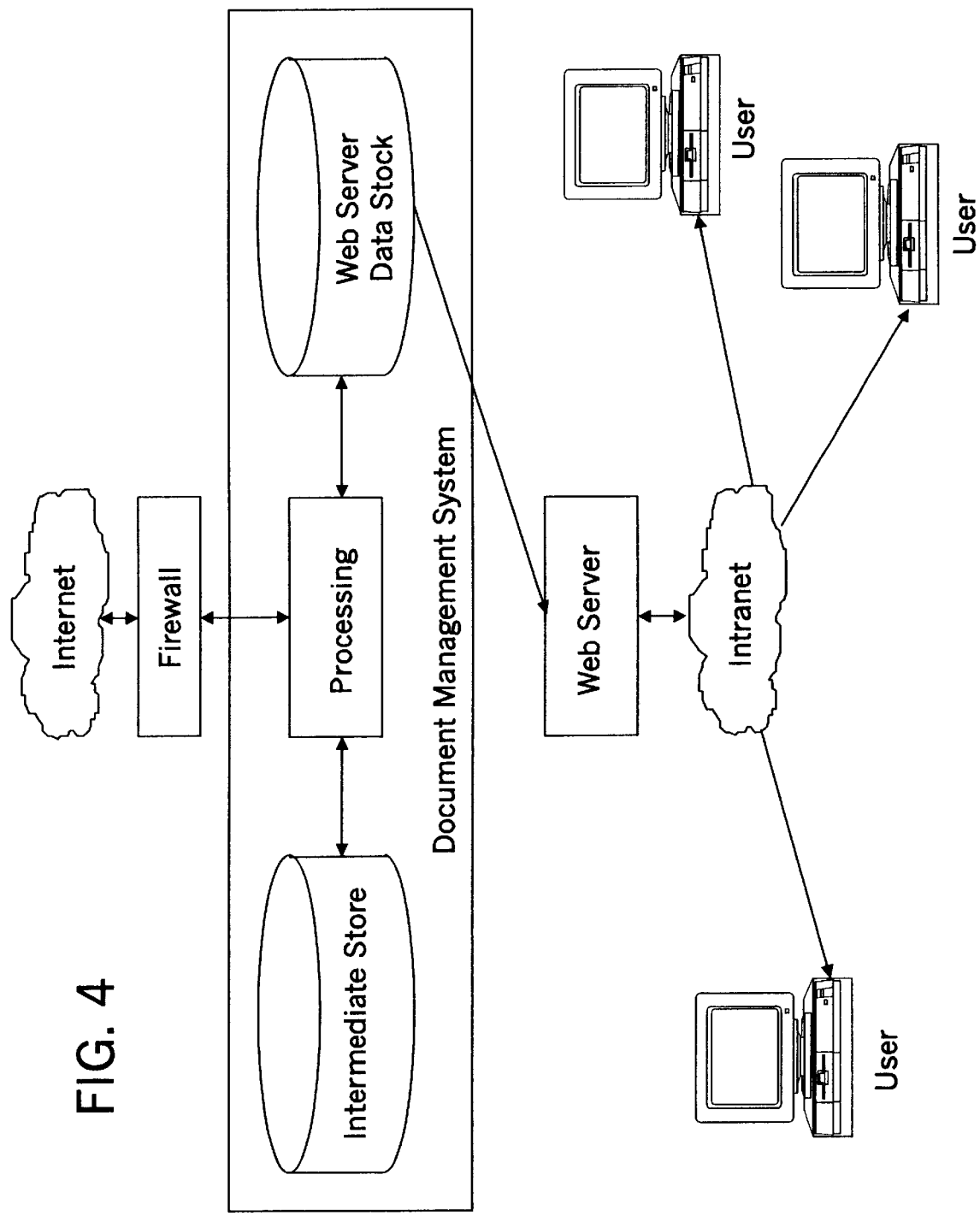
FIG. 4 shows an architectural model for the present invention.

FIG. 4 shows the structure in principle of the management system. In addition to actual processing of search requests, the management system has an intermediate store (memory) for the documents still to be processed by the management system and a database with the document stock of the web server for users connected to the intranet.

Figure 5:
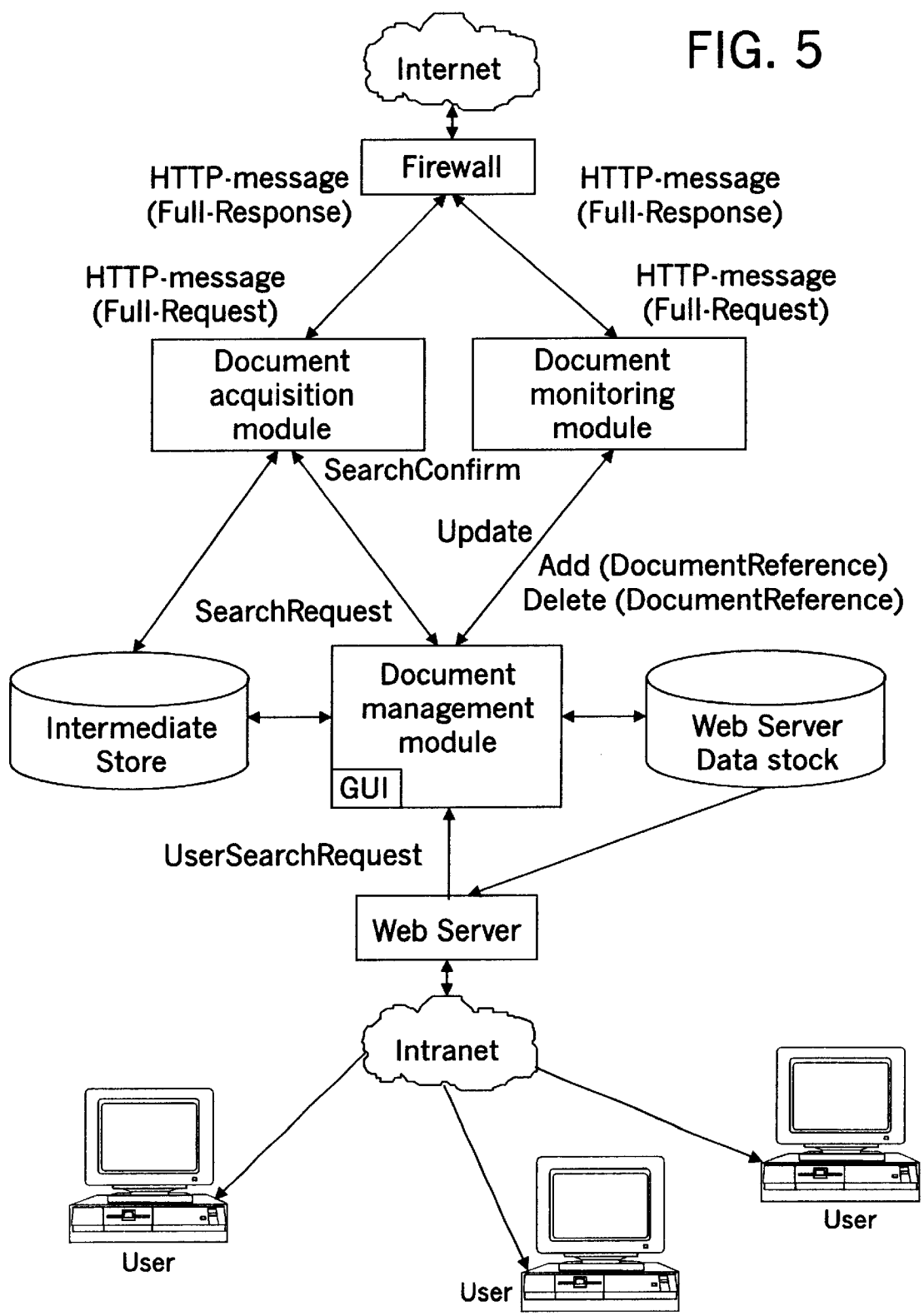
FIG. 5 shows an architectural model with service primitives for the present invention.
Figure 6:
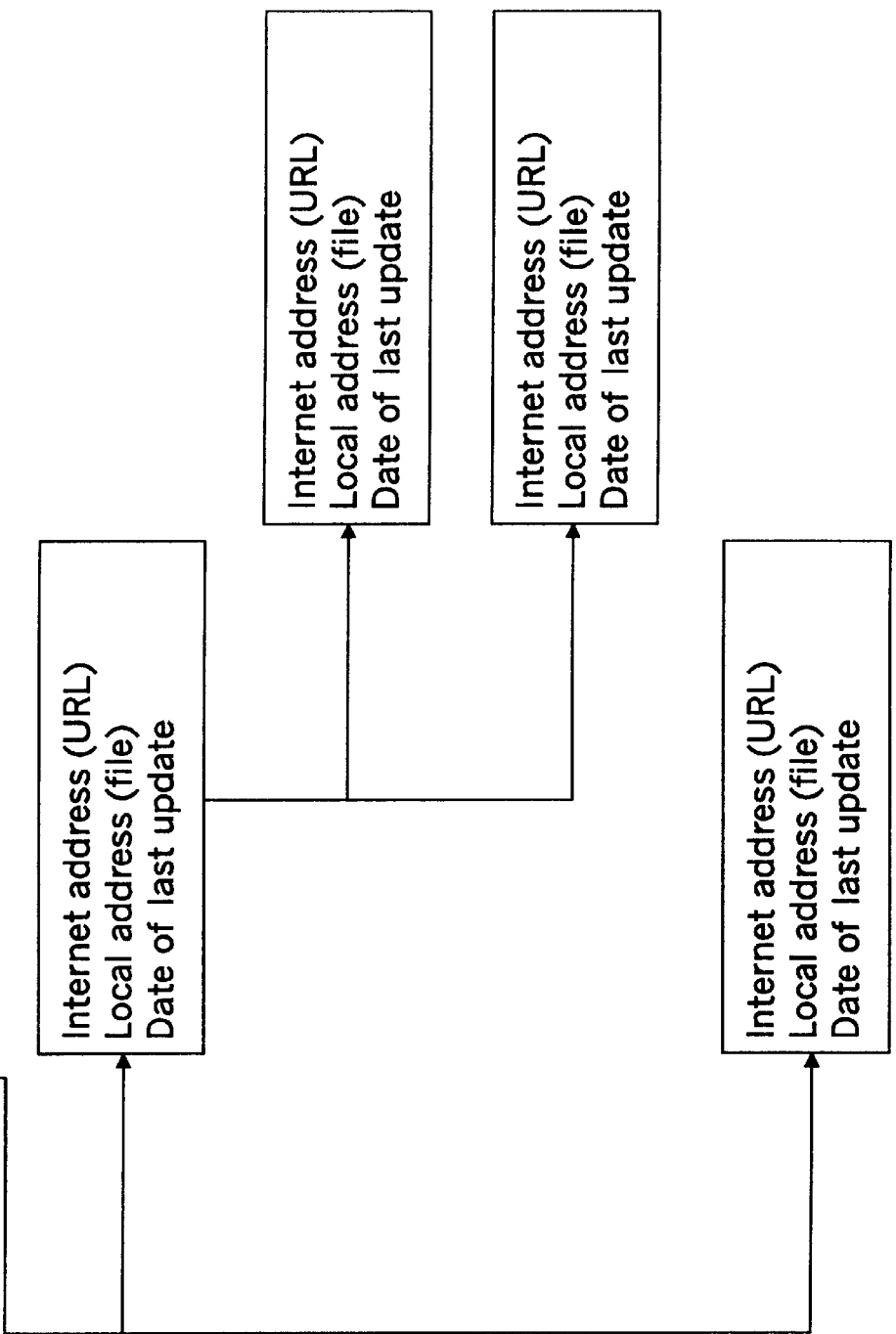
FIG. 6 shows a document monitoring structure for a tree-shaped data structure, taking the linkage of documents into account.

FIG. 5 shows the inventive management system with the components data acquisition, data monitoring and data management.

Document Acquisition

The document acquisition module consists of subcomponents of the WTA, which receive search jobs of the administrator (service primitive "SearchRequest") and output a return message (service primitive "SearchConfirm") once the relevant documents have been acquired successfully (service primitive "HTTP-message"). The documents acquired are filed for this purpose in a database, the intermediate store, for subsequent evaluation by the administrator. Search jobs are initiated in this process either by the administrator or commissioned directly by the users (service primitive "UserSearchRequest").

Document Monitoring

Documents supplied to the web server can be checked automatically by the system to see if they are up-to-date. To do this, the data monitoring module only needs to be informed which documents are filed locally and where their original is located in the internet. A structure which supplies this information is made up of the variables internet address (URL, Uniform Resource Locator, standard format for document addresses in the internet), local address and date of the last update. To describe the complete mini-web, the following example data structure constructed in the form of a tree results, taking the linkage of the documents into account.

This simple basic structure can be expanded in any way. Further attributes can be added to individual pages which determine for example whether the page is to be updated automatically in the event of a change in the corresponding web page in the internet or whether the administrator is to be informed in advance.

Document Management

Document management covers both the processing of user requests and the output of specific search and acquisition jobs to the document acquisition module as well as organizational management of the documents for the web server of the intranet. Users can forward their requests by means of the "UserSearchRequest" service primitive to document management. These requests are translated by the document management module into specific requests to the document acquisition module. For communication between the two modules, the service primitives "SearchRequest" and "SearchConfirm", which have already been introduced, are used. Requests by the administrator are processed directly with the help of a suitable management tool. This could for example support the user interface presented in FIG. 2. Communication between document management and the document monitoring module is achieved with the aid of the service primitives "Add" and "Delete", by means of which the module is informed of the current web server data stock. Conversely, the document monitoring module reports inconsistencies between current internet documents and the replicated data in the web server data stock to the document management module with the aid of the service primitive "Update". Thereupon the data can be re-requested by the document management module either automatically or under the control of the administrator.

Direct access to data in the internet from internal company networks is not always sensible for reasons of security and productivity. To enable employees to access current internet information without these disadvantages, the present application proposes a content management system, which replicates only the internet data which are relevant to company employees onto a local web server selectively, automatically and taking account of the specific characteristics of web documents. The documents can be rearranged in a manner independent of the internet and are thereby easier to find and more quickly accessible for the user. The information is therefore always up to date.

What is claimed is:

1. A method, in a document management system, for providing documents from a plurality of server systems to a plurality of client systems, wherein the document management system is coupled to the server systems via the Internet, and wherein the document management system includes a document database, the method comprising:

receiving search requests;

acquiring documents that are relevant to the search requests from the server systems; and filing the documents in the document database, wherein the client systems are configured to access the documents in the document database and wherein the document management system blocks access to the Internet for the plurality of client systems, wherein the plurality of client systems are coupled to the document management system via an intranet, and wherein a local web server is coupled to the intranet and connects the plurality of client systems to the document database.

2. A method, in a document management system, for providing documents from a plurality of server systems to a plurality of client systems, wherein the document management system is coupled to the server systems via the Internet, and wherein the document management system includes a document database, the method comprising:

receiving search requests;

acquiring documents that are relevant to the search requests from the server systems; and filing the documents in the document database, wherein the client systems are configured to access the documents in the document database and wherein the document management system blocks access to the Internet for the plurality of client systems, wherein the plurality of client systems are coupled to the document management system via an intranet, and wherein the document management system includes a document acquisition module and wherein the document acquisition module converts the search requests into a protocol supported by the plurality of servers and stores the documents in an intermediate store.

3. The method of claim 2, wherein the document acquisition module includes a search process that processes the search requests to identify documents that are relevant to the search requests.

4. The method of claim 3, wherein the search process comprises a Web Traffic Agent.

5. The method of claim 2, wherein the document management system includes an interface for allowing a user to add documents from the intermediate store into the document database.

6. The method of claim 5, wherein the interface allows the user to remove documents from the document database.

7. The method of claim 2, further comprising determining whether documents in the document database are up-to-date.

8. The method of claim 7, further comprising updating documents that are not up-to-date.

9. The method of claim 2, wherein the documents in the document database form a replicated portion of the Internet.

10. The method of claim 2, wherein the search request is generated in a natural language.

11. The method of claim 2, further comprising restricting access to the Internet to certain user groups.

12. A system for providing server system documents to clients on an intranet, comprising:

a document management system including a document database;

a plurality of client systems coupled to the document management system via an intranet;

a plurality of server systems, wherein the document management system is coupled to the server systems via the Internet; and a local web server, wherein the local web server is coupled to the intranet and connects the plurality of client systems to the document database, wherein the document management system receives search requests, acquires documents that are relevant to the search requests from the server systems, and files the documents in the document database, wherein the client systems are configured to access the documents in the document database and wherein the document management system blocks access to the Internet for the plurality of client systems.

13. A system for providing server system documents to clients on an intranet, comprising:

a document management system including a document database;

a plurality of client systems coupled to the document management system via an intranet; and a plurality of server systems, wherein the document management system is coupled to the server systems via the Internet, and a local web server, wherein the local web server is coupled to the intranet and connects the plurality of client systems to the document database, wherein the document management system receives search requests, acquires documents that are relevant to the search requests from the server systems, and files the documents in the document database, wherein the client systems are configured to access the documents in the document database and wherein the document management system blocks access to the Internet for the plurality of client systems, and wherein the document management system includes a document acquisition module, wherein the document acquisition module converts the search requests into a protocol supported by the plurality of servers and stores the documents in an intermediate store.

14. The system of claim 13, wherein the document acquisition module includes a search process that processes the search requests to identify documents that are relevant to the search requests.

15. The system of claim 14, wherein the search process comprises a Web Traffic Agent.

16. The system of claim 13, wherein the document management system includes an interface for allowing a user to add documents from the intermediate store into the document database.

17. The system of claim 16, wherein the interface allows the user to remove documents from the document database.

18. The system of claim 13, wherein the document management system includes a document monitoring module, wherein the document monitoring module determines whether documents in the document database are up-to-date.

19. The system of claim 13, wherein the documents in the document database form a replicated portion of the Internet.

20. A computer program product, in a computer readable medium, for providing documents from a plurality of server systems to a plurality of client systems, wherein the document management system is coupled to the server systems via the Internet, and wherein the document management system includes a document database, the method comprising:

instructions for receiving search requests;

instructions for acquiring documents that are relevant to the search requests from the server systems;

instructions for converting the search requests into a protocol supported by the plurality of servers and stores the documents in an intermediate store; and instructions for filing the documents in the document database, wherein the client systems are configured to access the documents in the document database and wherein the document management system blocks access to the Internet for the plurality of client systems, and wherein the plurality of client systems are coupled to a document management system via an intranet.

* * * * *